(12) United States Patent
Weber

(10) Patent No.: US 9,228,596 B2
(45) Date of Patent: Jan. 5, 2016

(54) DIRECT DRIVE ROTARY VALVE

(71) Applicant: Moog Inc., East Aurora, NY (US)

(72) Inventor: Gregory Bruce Weber, Carson City, NV (US)

(73) Assignee: MOOG INC., East Aurora, NY (US)

( * ) Notice: Subject to any disclaimer, the term of this patent is extended or adjusted under 35 U.S.C. 154(b) by 217 days.

(21) Appl. No.: 14/034,166

(22) Filed: Sep. 23, 2013

(65) Prior Publication Data

US 2015/0083256 A1    Mar. 26, 2015

(51) Int. Cl.
*F16K 11/076* (2006.01)
*F15B 13/04* (2006.01)

(52) U.S. Cl.
CPC .......... *F15B 13/0406* (2013.01); *F16K 11/076* (2013.01); *F15B 2013/0412* (2013.01); *Y10T 137/86654* (2015.04)

(58) Field of Classification Search
CPC .......... F15B 13/0406; F15B 2013/0412; F16K 11/076; Y10T 137/86646
USPC ................................... 137/625.22
See application file for complete search history.

(56) References Cited

U.S. PATENT DOCUMENTS

| | | |
|---|---|---|
| 2,946,348 A | 7/1960 | North |
| 4,658,859 A | 4/1987 | Backe et al. |
| 4,794,845 A | 1/1989 | Vick |
| 4,800,924 A | 1/1989 | Johnson |
| 4,858,650 A | 8/1989 | Devaud et al. |
| 5,597,014 A | 1/1997 | Vick |
| 5,868,165 A | 2/1999 | Tranovich |
| 5,954,093 A | 9/1999 | Leonard |
| 6,269,838 B1 | 8/2001 | Woodworth et al. |
| 6,470,913 B1 | 10/2002 | Woodworth |
| 6,594,992 B1 | 7/2003 | Naito et al. |
| 6,808,162 B2 | 10/2004 | Tranovich et al. |
| 2007/0215222 A1 | 9/2007 | Rauch et al. |

FOREIGN PATENT DOCUMENTS

| | | |
|---|---|---|
| DE | 102011055902 A1 * | 6/2013 |
| EP | 0102884 A1 | 3/1984 |
| GB | 2104249 | 3/1983 |

OTHER PUBLICATIONS

English translation of DE 102011055902 A1, Jun. 6, 2013.*

* cited by examiner

*Primary Examiner* — Craig Schneider
*Assistant Examiner* — Paul Gray
(74) *Attorney, Agent, or Firm* — Hodgson Russ LLP

(57) ABSTRACT

A rotary valve comprises a bushing and a cylindrical spool rotatably received by the bushing. The rotary valve avoids redundant control edge pairs by having exactly one first supply edge pair (P-C1) for controlling a first fluid supply path, exactly one second supply edge pair (P-C2) for controlling a second fluid supply path, exactly one first return edge pair (C2-R1) for controlling a first fluid return path, and exactly one second return edge pair (C1-R2) for controlling a second fluid return path. A first angle between the first supply edge pair and the first return edge pair, and a second angle between the second supply edge pair and the second return edge pair, are each greater than or equal to 120 degrees and less than 180 degrees. Geometric simplicity is achieved by tolerating a limited degree of force imbalance in valve operation.

20 Claims, 15 Drawing Sheets

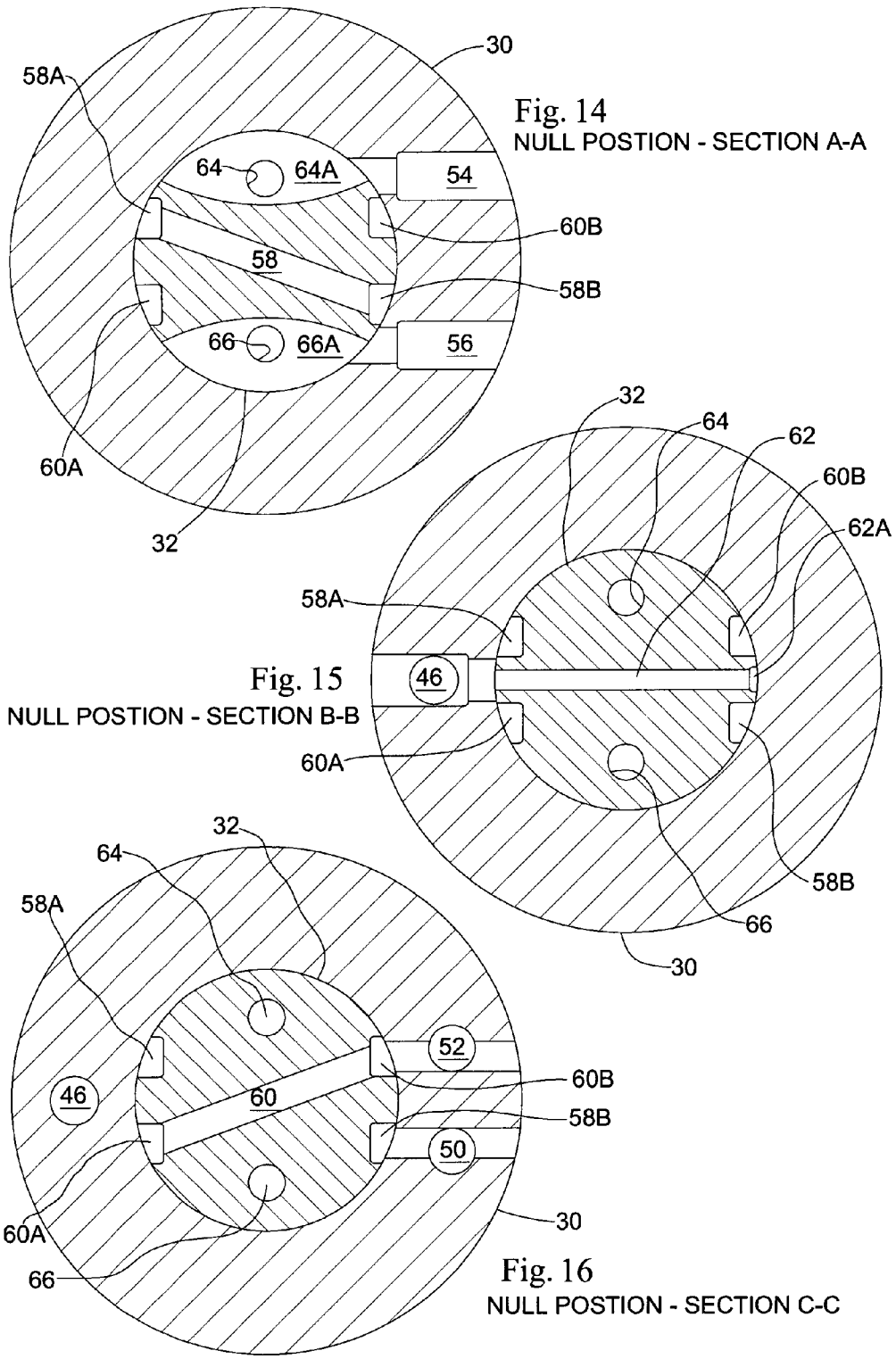

FIRST METERING
POSTION - SECTION A-A

FIRST METERING
POSTION - SECTION B-B

FIRST METERING
POSTION - SECTION C-C

SECOND METERING
POSTION - SECTION A-A

SECOND METERING
POSTION - SECTION B-B

SECOND METERING
POSTION - SECTION C-C

DIRECT DRIVE ROTARY VALVE

FIELD OF THE INVENTION

The invention relates generally to the field of rotary valves having a spool member rotatably mounted within a bushing, and, more particularly, to a four-way rotary valve having a simplified geometry that is more economical to manufacture than rotary valves of the prior art.

BACKGROUND OF THE INVENTION

Direct drive rotary valves are known for controlling flow of hydraulic fluid between a high pressure fluid source (P) and fluid-powered load, such as a hydraulic actuator. FIG. 1 schematically illustrates a known system in which a four-way rotary valve is used to meter hydraulic fluid to and from opposed chambers of a fluid-powered load in the form of a hydraulic actuator. A common rotary valve configuration includes a spool rotatably mounted within a bushing. The spool and bushing include various ports and passages configured to open and close flow paths to and from the fluid-powered load depending upon the rotational position of the spool relative to the bushing. For example, where the load is a hydraulic actuator having first and second opposed chambers, the rotary valve may be configured to open a first fluid supply path (P to C1) for delivering fluid from a pressure source to the first chamber, while simultaneously opening a first fluid return path (C2 to R1) by which fluid may return from the second chamber to a system reservoir. The same rotary valve may be adjusted by rotating the spool to open a second fluid supply path (P to C2) for delivering fluid from the pressure source to the second chamber, while simultaneously opening a second fluid return path (C1 to R2) by which fluid may return from the first chamber to the reservoir. When the first fluid supply path (P to C1) and the first fluid return path (C2 to R1) are open, the second fluid supply path (P to C2) and the second fluid return path (C1 to R2) are closed, and vice versa.

The spool may be driven by a torque motor through a limited range of rotation relative to the bushing. The spool has a rotational null position relative to the bushing, wherein flow of pressurized fluid is shut off to both chambers. Rotation of the spool relative to the bushing away from the null position progressively opens supply and return paths. Rotation of the spool in one direction from the null position supplies fluid to the first chamber via first supply path (P to C1) and enables return flow from the second chamber via first return path (C2 to R1), whereas rotation of the spool in an opposite direction from the null position supplies fluid to the second chamber via second supply path (P to C2) and enables return flow from the first chamber via second return path (C1 to R2).

A problem encountered in rotary valves of the type described above is that the inflow of pressurized fluid acts on spool surfaces, causing imbalance in the spool and making the spool more difficult to rotate. As a result, torque motor load requirements are increased, accompanied by greater size and weight of the motor. For many applications, particularly aerospace actuation systems, the added size and weight may be unacceptable.

Efforts have been made to overcome the problem of imbalance. Under one approach, the spool and bushing are provided with redundant metering edge pairs arranged to balance forces imparted to the spool by the flow of pressurized fluid. However, designs according to this approach have been very costly to produce due to added complexity in machining additional ports and flow channels in the spool, which typically is a miniature component on the order of 7 mm in diameter by 10 mm in axial length. Moreover, this approach presents added challenges with respect to synchronization of the edge pairs. Under another approach, a large radial clearance is provided between the spool and bushing, with the spool being mounted on bearings. However, designs according to this approach have done a poor job of controlling internal leakage. Consequently, designs using one or both of the mentioned approaches have not been widely adopted by industry.

What is needed is a rotary valve design that is geometrically simple for ease of manufacturing, yet also reduces spool imbalance to an acceptable level.

SUMMARY OF THE INVENTION

The present invention provides a rotary valve that meets the need stated above.

A rotary valve embodying the invention generally comprises a bushing including an axially extending cylindrical bore defining an inner wall of the bushing, and a cylindrical spool received by the cylindrical bore for rotation relative to the bushing about a central axis. The bushing and the spool are configured to provide a first fluid supply path (P to C1), a second fluid supply path (P to C2), a first fluid return path (C2 to R1), and a second fluid return path (C1 to R2), as may be required for controlling flow to and from opposed first and second chambers of a fluid-powered load, such as a hydraulic actuator.

The spool may be rotated relative to the bushing from a null position to open the first fluid supply path (P to C1) and the first fluid return path (C2 to R1). The spool may be rotated in an opposite direction from the null position to open the second fluid supply path (P to C2) and the second fluid return path (C1 to R2). The bushing and the spool include respective edges defining a first supply edge pair (P-C1), wherein the respective edges of the first supply edge pair are angularly displaceable relative to one another to open and close the first fluid supply path. The bushing and the spool further include respective edges defining a second supply edge pair (P-C2), wherein the respective edges of the second supply edge pair are angularly displaceable relative to one another to open and close the second fluid supply path. The bushing and the spool also have respective edges defining a first return edge pair (C2-R1), wherein the respective edges of the first return edge pair are angularly displaceable relative to one another to open and close the first fluid return path. Finally, the bushing and the spool have respective edges defining a second return edge pair (C1-R2), wherein the respective edges of the second return edge pair are angularly displaceable relative to one another to open and close the second fluid return path.

In an aspect of the present invention, the rotary valve comprises exactly one first supply edge pair, exactly one second supply edge pair, exactly one first return edge pair, and exactly one second return edge pair. Accordingly, each path is opened and closed by controlling only one edge pair, and redundant edge pairs for opening and closing the two fluid supply paths and the two fluid return paths are not used.

In another aspect of the present invention, the first supply edge pair (P-C1) is angularly spaced from the first return edge pair (C2-R1) by a first angle greater than or equal to 120 degrees and less than 180 degrees, and the second supply edge pair (P-C2) is angularly spaced from the second return edge pair (C1-R2) by a second angle greater than or equal to 120 degrees and less than 180 degrees. Consequently, geometric simplicity may be achieved by tolerating a limited degree of imbalance in valve operation. In one embodiment of the invention, the first angle and the second angle are each greater than or equal to 140 degrees and less than or equal to 145 degrees. In another embodiment of the invention, the first angle and second angle are equal in magnitude.

In an exemplary embodiment of the invention, a rotary valve is configured for metering fluid flow from a source of pressurized fluid with respect to a first chamber and a second chamber in a fluid-powered load.

In the exemplary embodiment, the bushing includes a fluid source passageway adapted for communication with the source of pressurized fluid, a first metering conduit adapted for flow communication with the first chamber of the fluid-powered load, and a second metering conduit adapted for flow communication with the second chamber of the fluid-powered load. The bushing also includes a first return duct and a second return duct each open through the inner wall of the bushing.

In the exemplary embodiment, the spool includes a first metering channel and a second metering channel each extending transversely through the spool. The spool also includes a first return passage and a second return passage.

According to the exemplary embodiment, the spool has a null rotational position wherein the fluid source passageway is not in flow communication with either of the first and second metering channels, a first metering rotational position wherein the fluid source passageway is in flow communication with the first metering channel but not the second metering channel while the second metering channel is in flow communication with the first return passage by way of the first return duct, and a second metering position wherein the fluid source passageway is in flow communication with the second metering channel but not the first metering channel while the first metering channel is in flow communication with the second return passage by way of the second return duct.

BRIEF DESCRIPTION OF THE DRAWINGS

The nature and mode of operation of the present invention will now be more fully described in the following detailed description of the invention taken with the accompanying drawing figures, in which:

FIG. 14 is a sectional view of the rotary valve taken generally along the line A-A in FIG. 13, wherein the spool is shown in a null rotational position relative to an outer bushing of the rotary valve;

FIG. 15 is a sectional view of the rotary valve taken generally along the line B-B in FIG. 13, wherein the spool is shown in the null rotational position;

FIG. 16 is a sectional view of the rotary valve taken generally along the line C-C in FIG. 13, wherein the spool is shown in the null rotational position;

DETAILED DESCRIPTION OF THE INVENTION

Figure 1:
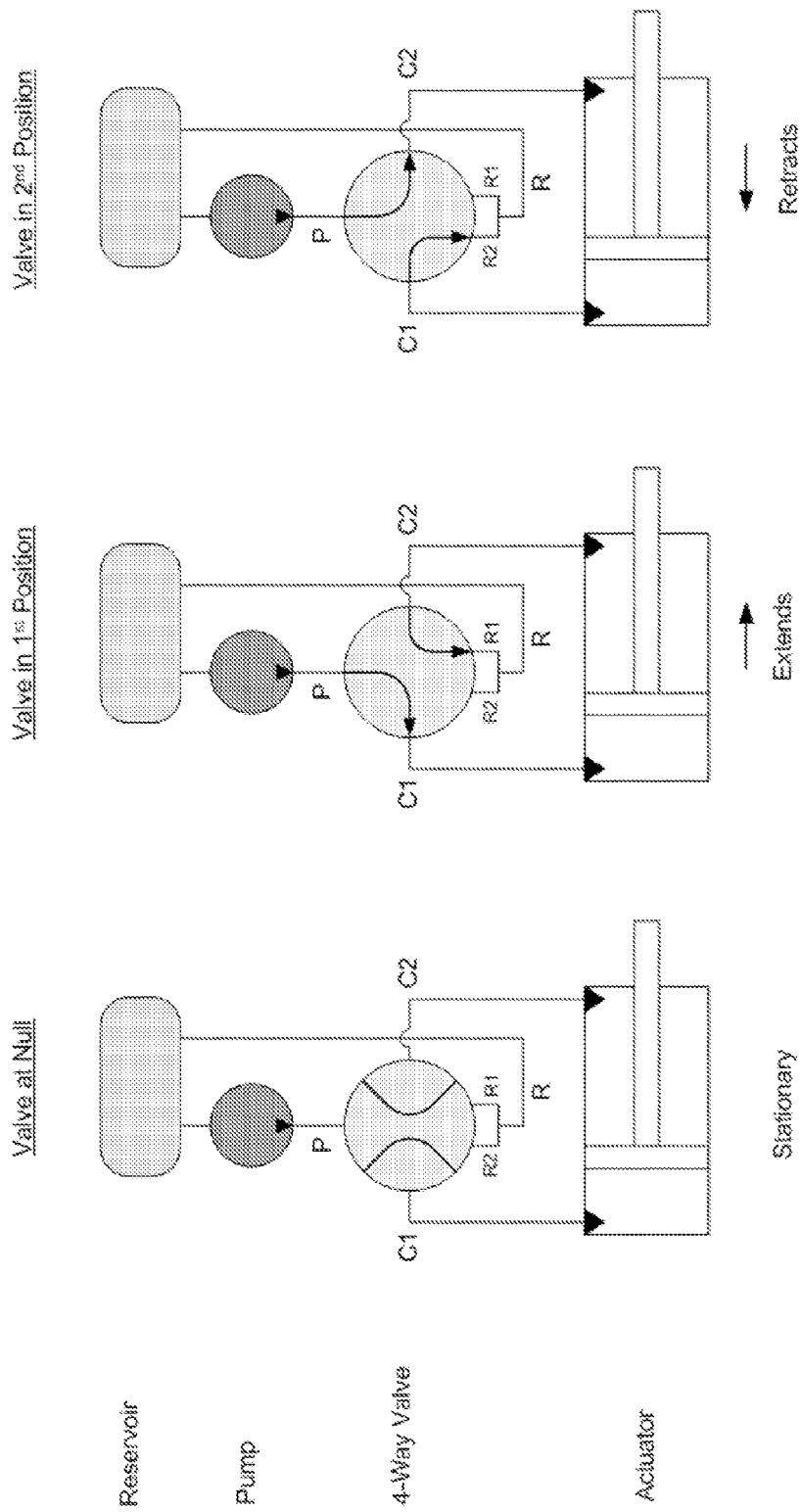
FIG. 1 schematically illustrates a known system in which a four-way rotary valve is used to meter hydraulic fluid to and from opposed chambers of a hydraulic actuator.
Figure 2:
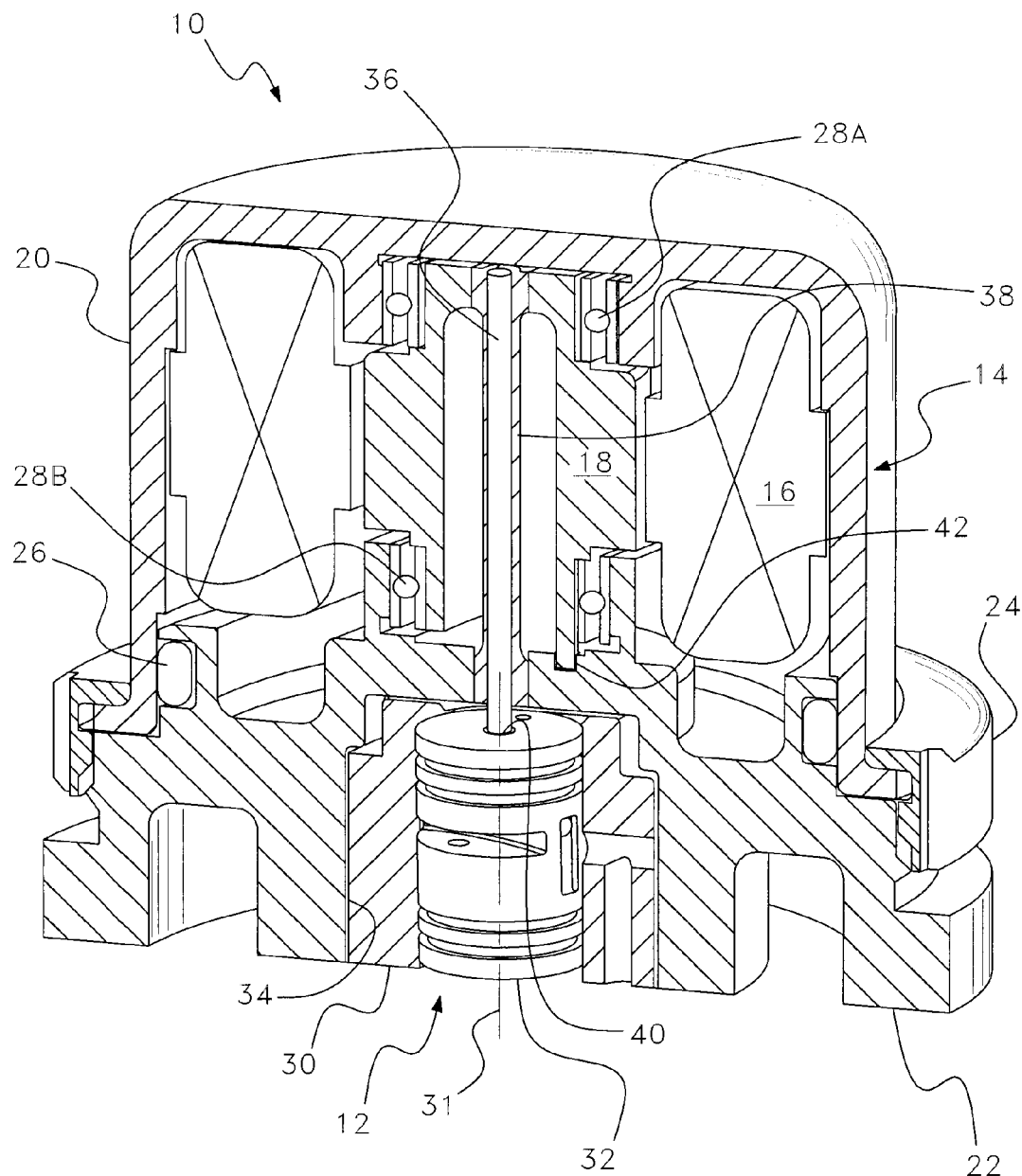
FIG. 2 is a cross-sectioned perspective view of a direct-drive rotary valve mechanism incorporating a rotary valve formed in accordance with an embodiment of the present invention.

FIG. 2 shows a direct drive rotary valve mechanism 10 incorporating a rotary valve 12 formed in accordance with an embodiment of the present invention. Valve mechanism 10 may be used as either a pilot stage valve mechanism or as a standalone single stage valve mechanism in aerospace and industrial settings. The illustrated valve mechanism 10 comprises a torque motor 14 including a stator 16 and a rotor 18. Torque motor 14 is enclosed by an outer cover 20 and is separated from rotary valve 12 by a valve seat 22 on which cover 20 is mounted by a retaining nut 24. Stator 16 may be fixed to an inner wall surface of cover 20, for example by using adhesive. A compressible O-ring 26 is disposed in an outer groove of valve seat 22 for fluid sealing contact with the inner wall surface of cover 20. Rotor 18 is supported at one end by a rotary bearing 28A engaging a collar formed in cover 20, and at its opposite end by another rotary bearing 28B engaging a collar formed in valve seat 22.

As will be described in greater detail below, rotary valve 12 includes an outer bushing 30 and an inner spool 32 rotatable relative to bushing 30 about a central axis 31. In the embodiment depicted in FIG. 2, bushing 30 is secured within a cylindrical recess 34 in valve seat 22 by interference fit. Torque motor 14, and more particularly rotor 18, is connected to spool 32 by a drive quill 36 arranged within a torsion tube 38. An upper portion of drive quill 36, as viewed in FIG. 2, may be welded to torsion tube 38. An upper portion of torsion tube 38 may be welded to rotor 18, and a lower portion of torsion tube 38 may arranged in a central hole through valve seat 22 and welded to the valve seat. Rotation of rotor 18 encounters torsional resistance from fixed torsion tube 38, which provides a rotational restoring force to rotor 18 and drive quill 36 when energizing current to torque motor 14 is shut off. A lower portion of drive quill 36 passes through the torsion tube 38 and is fixed within a central mounting hole 40 in spool 32, for example by a metal brazing process. Rotor 18 and valve seat 22 may be configured to provide a pair of mechanical stops 42 limiting the range rotation of rotor 18 (only one stop is visible in the cross-sectional view of FIG. 2). For example, mechanical stops 42 may limit rotational motion to a range of +/−5 degrees from a 0 degree position corresponding to an OFF state of motor 14. As will be understood, torque motor 14 is operable to cause limited rotation of spool 32 relative to bushing 30 in opposite rotational directions depending upon a chosen motor rotation direction. While mechanical stops 42 define a maximum possible range of rotation, motor 14 may be commanded so as to provide a more limited range of rotational motion. For example, spool 32, bushing 30, and torsion tube 38 may be designed for a rotational range of +/−2 degrees, however the invention is not limited to this range of rotation.

As will be described in greater detail below, bushing 30 and spool 32 are configured with cooperating pockets and passages to receive fluid from a source of pressurized fluid, and to provide a first fluid supply path (P to C1), a second fluid supply path (P to C2), a first fluid return path (C2 to R1), and a second fluid return path (C1 to R2). The paths that are opened and closed depend upon the rotational position of spool 32 relative to bushing 30. More specifically, spool 32 has a null rotational position wherein the first and second fluid supply paths (P to C1 and P to C2) are closed off from the pressurized fluid source, a first metering position wherein the first fluid supply path (P to C1) is open and the second fluid supply path (P to C2) is closed, and a second metering position wherein the second fluid supply path (P to C2) is open and the first fluid supply path (P to C1) is closed. The first fluid return path (C2 to R1) may be open when spool 32 is in the first metering position relative to bushing 30, and the second fluid return path (C1 to R2) may be open when the spool is in the second metering position relative to the bushing. Consequently, a first chamber of a two-chamber load (e.g. a hydraulic actuator) may be connected in flow communication with the first fluid supply path (P to C1) at the same time a second chamber of the load is connected to the first fluid return path (C2 to R1) by rotating spool 32 through a predetermined angle in a first rotational direction. Likewise, the first chamber may be connected in flow communication with the second fluid return path (C1 to R2) at the same time the second chamber of the load is connected to the second fluid supply path (P to C2) by rotating spool 32 through a predetermined angle in a second rotational direction opposite the first direction. In the present embodiment, the null position of spool 32 is intermediate the first and second rotational positions; spool 32 is biased toward the null position by torsion tube 38 when energizing current to torque motor 14 is shut off.

Figure 3:
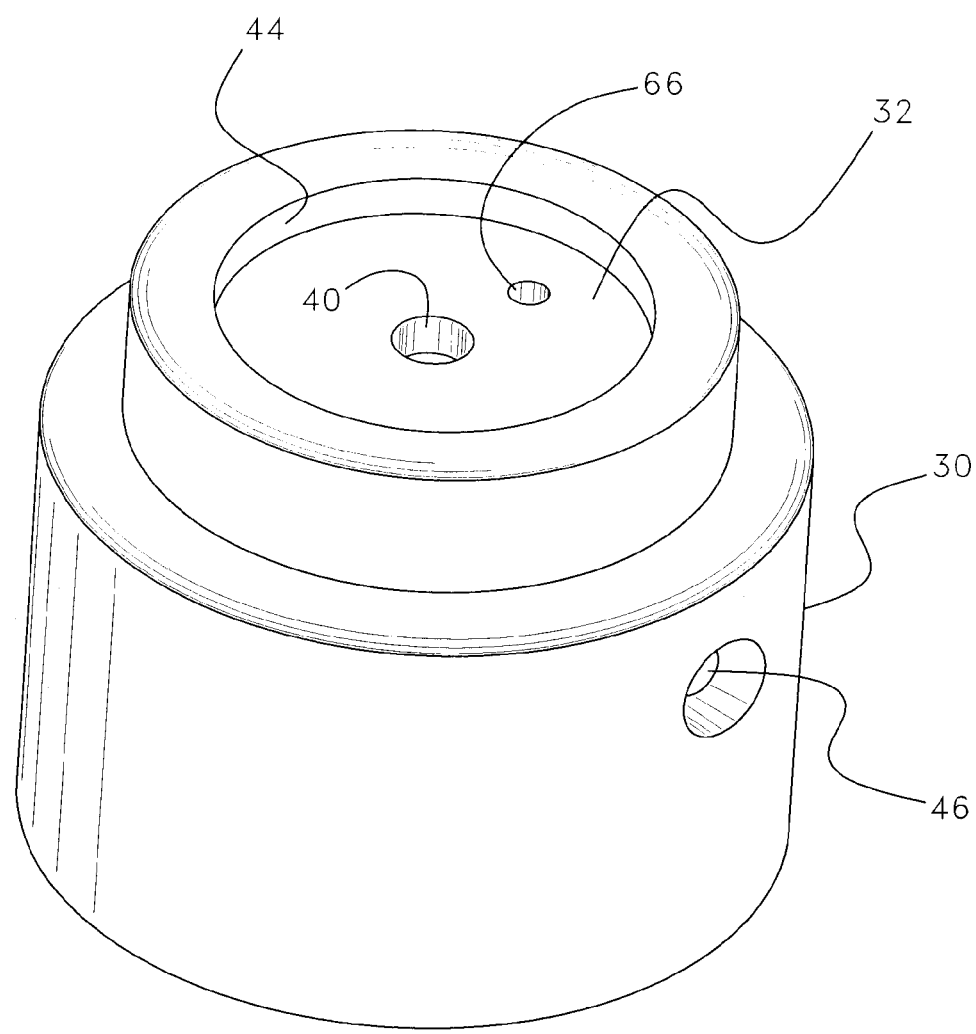
FIG. 3 is an enlarged perspective view of the rotary valve of the mechanism shown in FIG. 2.
Figure 4:
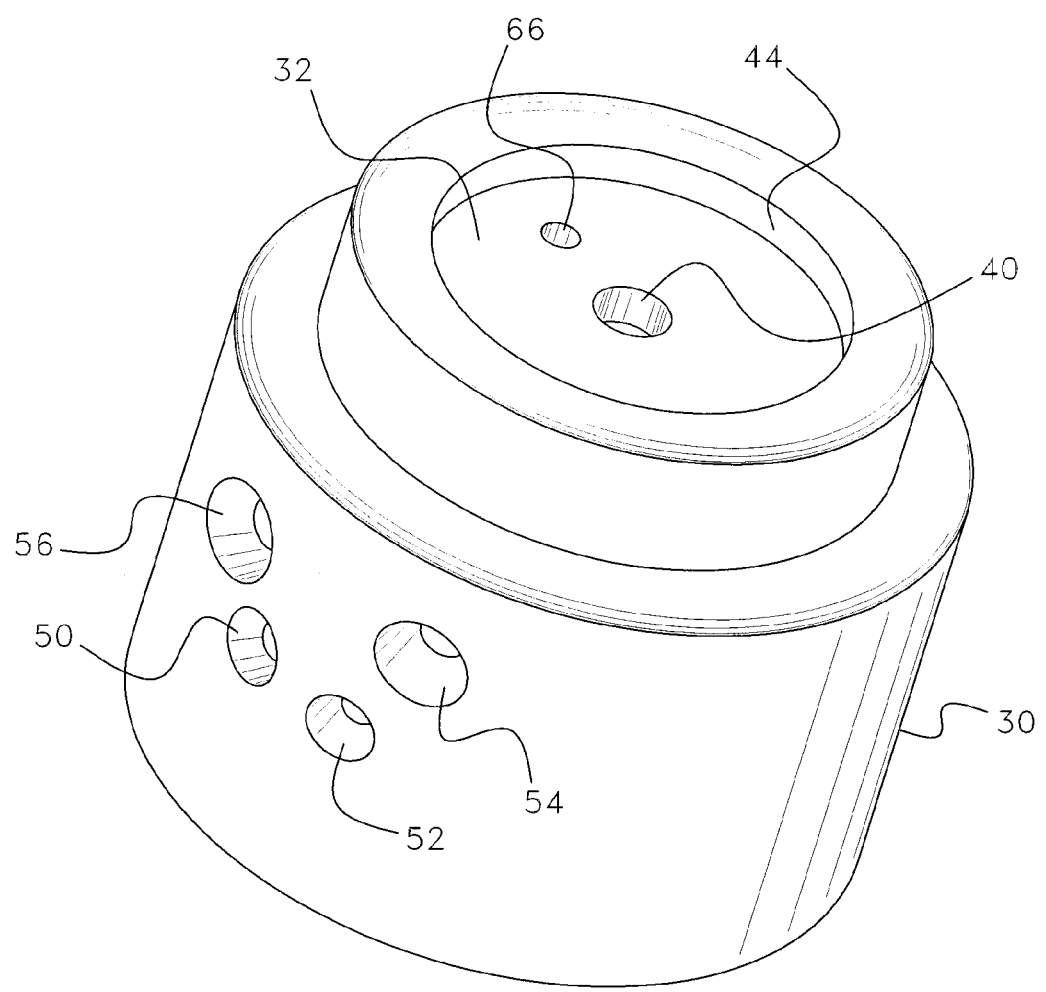
FIG. 4 is another enlarged perspective view of the rotary valve.
Figure 5:
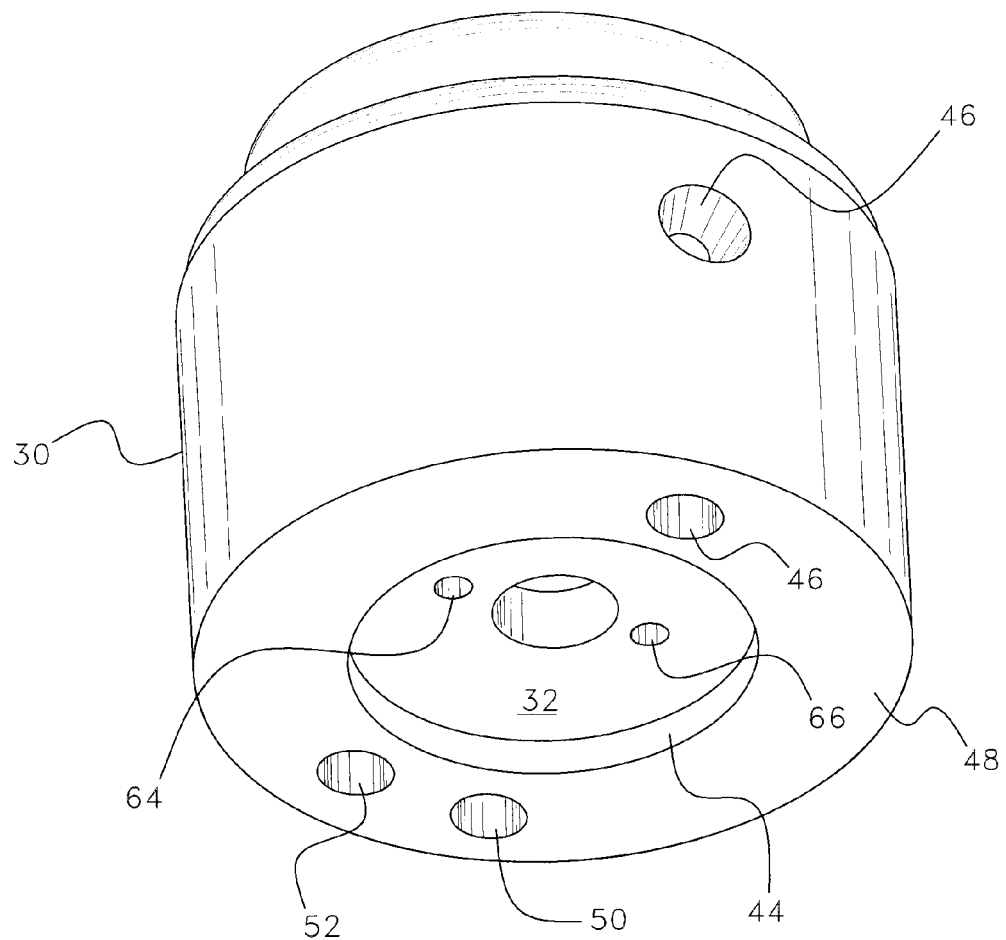
FIG. 5 is a further enlarged perspective view of the rotary valve.

Reference is now made to FIGS. 3-6 showing rotary valve 12 comprising bushing 30 and spool 32. Bushing 30 includes an axially extending cylindrical bore 44 defining an inner wall of the bushing. In FIGS. 3 and 5, bushing 30 can be seen as including a fluid source passageway 46 adapted for communication with a source of pressurized fluid. Fluid source passageway 46 may be a right angle passageway extending through an end face 48 of bushing 30, as shown in FIG. 5, and running parallel to axis 31 until it turns in a transverse radial direction upon meeting with another portion of passageway 46 formed through an outer cylindrical surface of bushing 30. Fluid source passageway 46 opens through inner wall 44 of bushing 30. Pressurized fluid enters passageway 46 through the port in end face 48, and is redirected radially toward spool 32.

Figure 6:
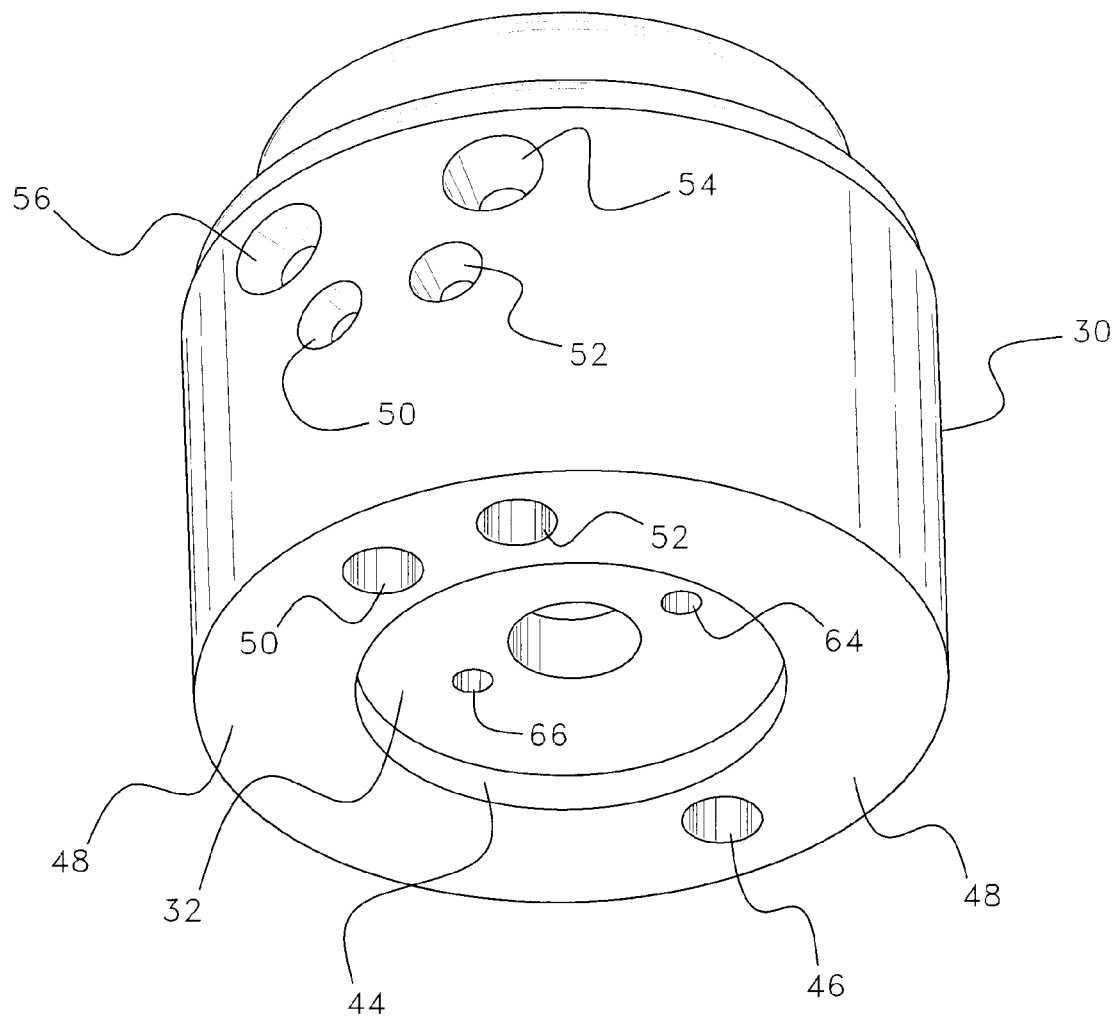
FIG. 6 is yet another enlarged perspective view of the rotary valve.
Figure 7:
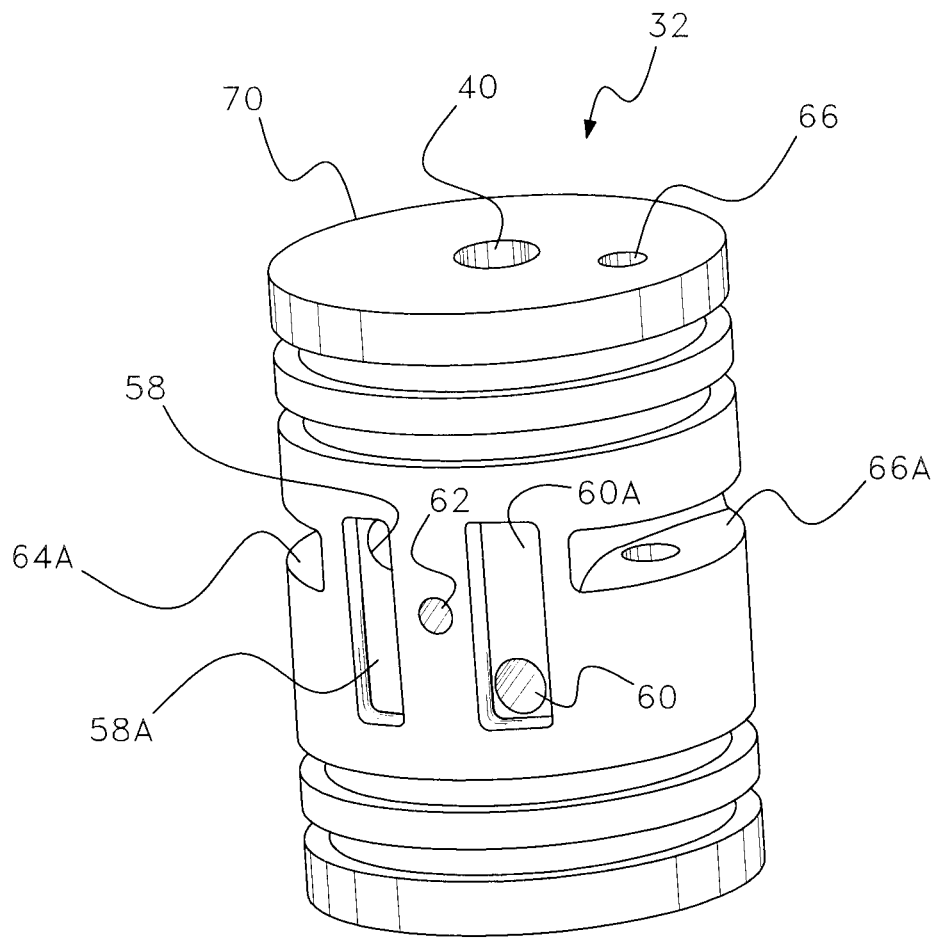
FIG. 7 is an enlarged perspective view of a spool of the rotary valve shown in FIGS. 3-6.
Figure 8:
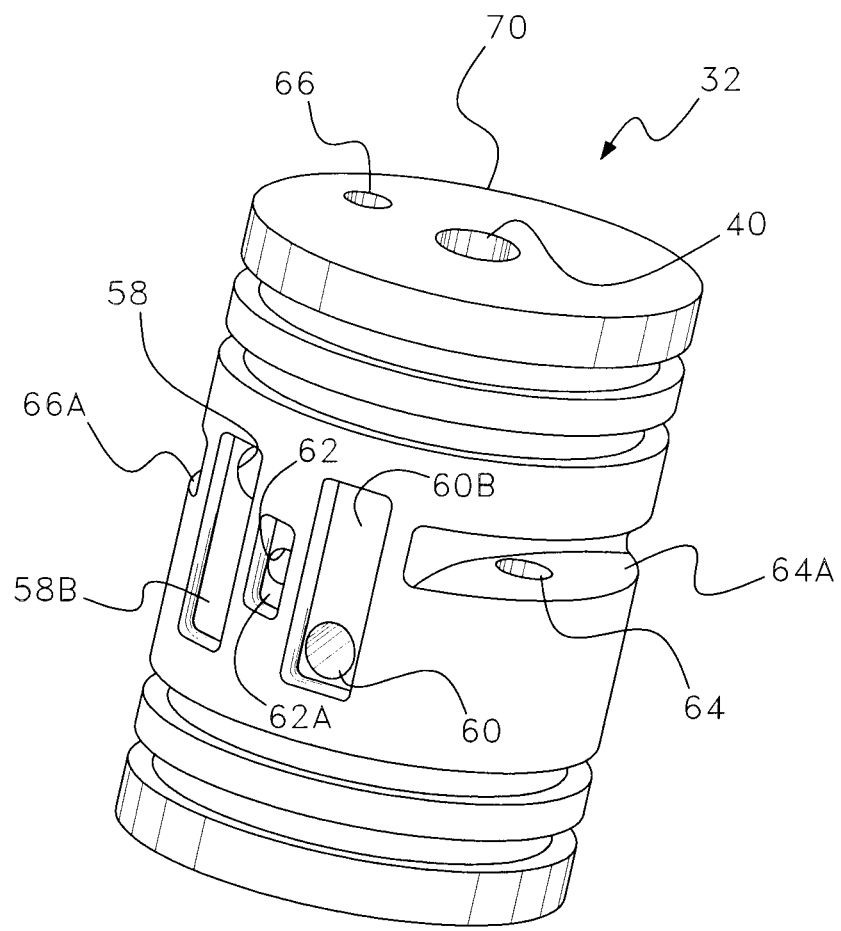
FIG. 8 is another enlarged perspective view of the spool.
Figure 9:
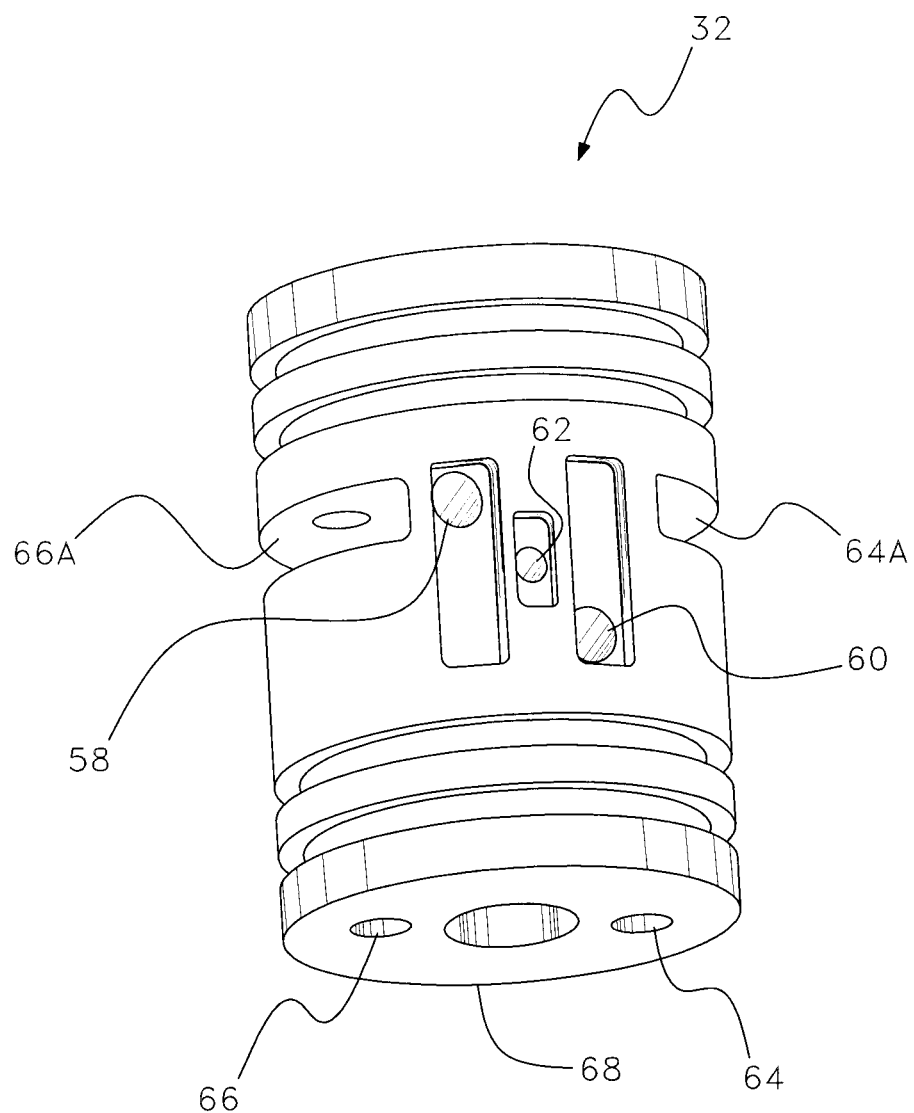
FIG. 9 is a further enlarged perspective view of the spool.

In FIGS. 4-6, bushing 30 can be seen as further including a first metering conduit 50 adapted for flow communication with a first chamber of a fluid-powered load (not shown), and a second metering conduit 52 adapted for flow communication with a second chamber of the fluid-powered load. Similar to fluid source passageway 46, metering conduits 50 and 52 are right angle conduits having an axially extending portion through the end face 48 of bushing 30 and a transversely extending portion through the outer cylindrical surface of bushing 30. The transversely extending portion of each metering conduit 50, 52 may extend radially toward central axis 31, or in a chordal direction (i.e. parallel to a diameter of the bushing), and opens through inner wall 44. First metering conduit 50 may receive pressurized fluid and direct it toward the first chamber of the load, or it may provide part of a second return path (C1 to R2) allowing fluid to return from the first chamber to a pressure source, depending upon the rotational position of spool 32 as will be explained in greater detail below. Likewise, second metering conduit 52 may receive pressurized fluid and direct it toward the second chamber of the load, or it may provide part of a first return path (C2 to R1) allowing fluid to return from the second chamber of the load to the pressure source, depending upon the rotational position of spool 32.

FIGS. 4 and 6 show bushing 30 as further including a first return duct 54, and a second return duct 56. Return ducts 54 and 56 extend in a transverse direction of bushing 30 and open through inner wall 44. Return ducts 54 and 56 may be formed as holes drilled through the outer cylindrical surface of bushing 30 in a radial or chordal direction.

As will be appreciated from the foregoing description, when bushing 30 is secured within cylindrical recess 34 in valve seat 22 by interference fit, the openings in the outer cylindrical surface of the bushing formed by transverse portions of fluid source passageway 46, metering conduits 50 and 52, and return ducts 54 and 56 are sealed by the wall of recess 34. As a result, bushing 30 may be manufactured in simple and economical fashion without any transverse blind holes.

Figure 10:
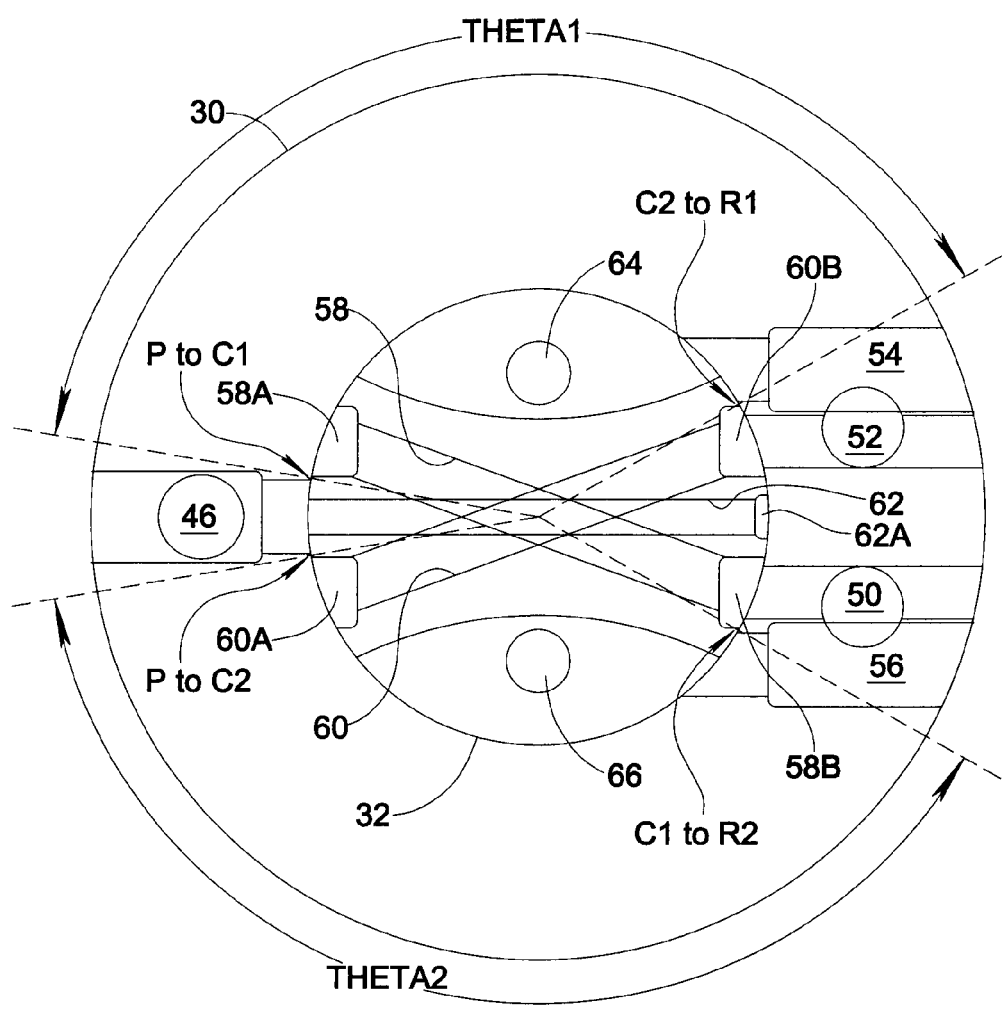
FIG. 10 is a schematic top plan view of the rotary valve shown in FIGS. 3-6.
Figure 11:
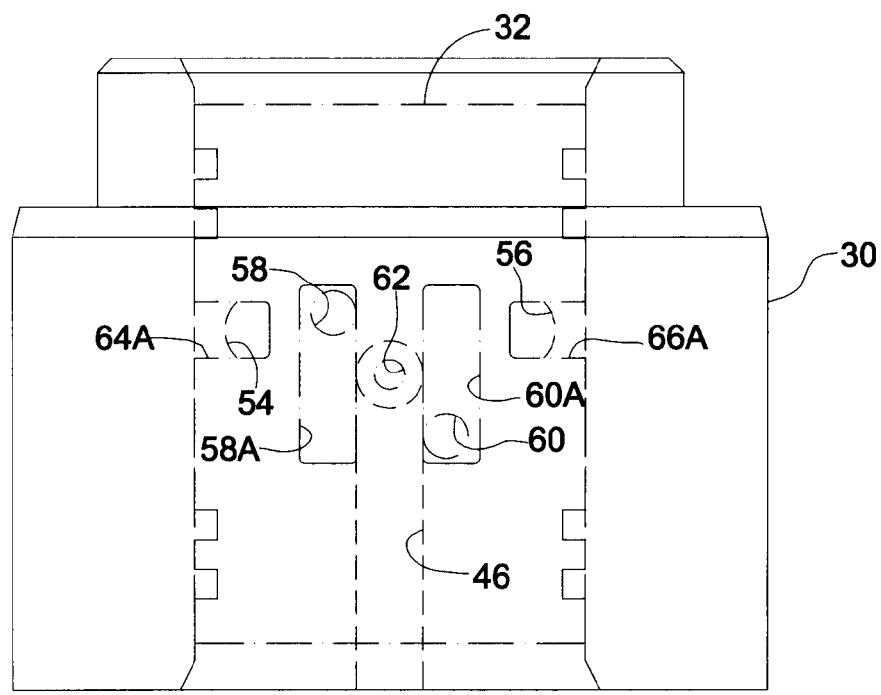
FIG. 11 is a schematic front elevational view of the rotary valve.
Figure 12:
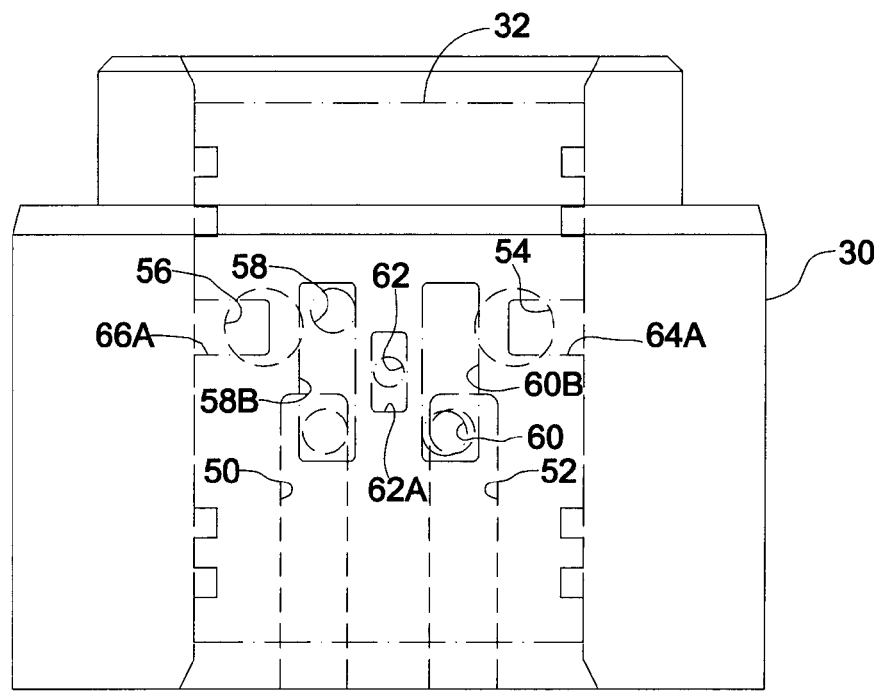
FIG. 12 is a schematic rear elevational view of the rotary valve.
Figure 13:
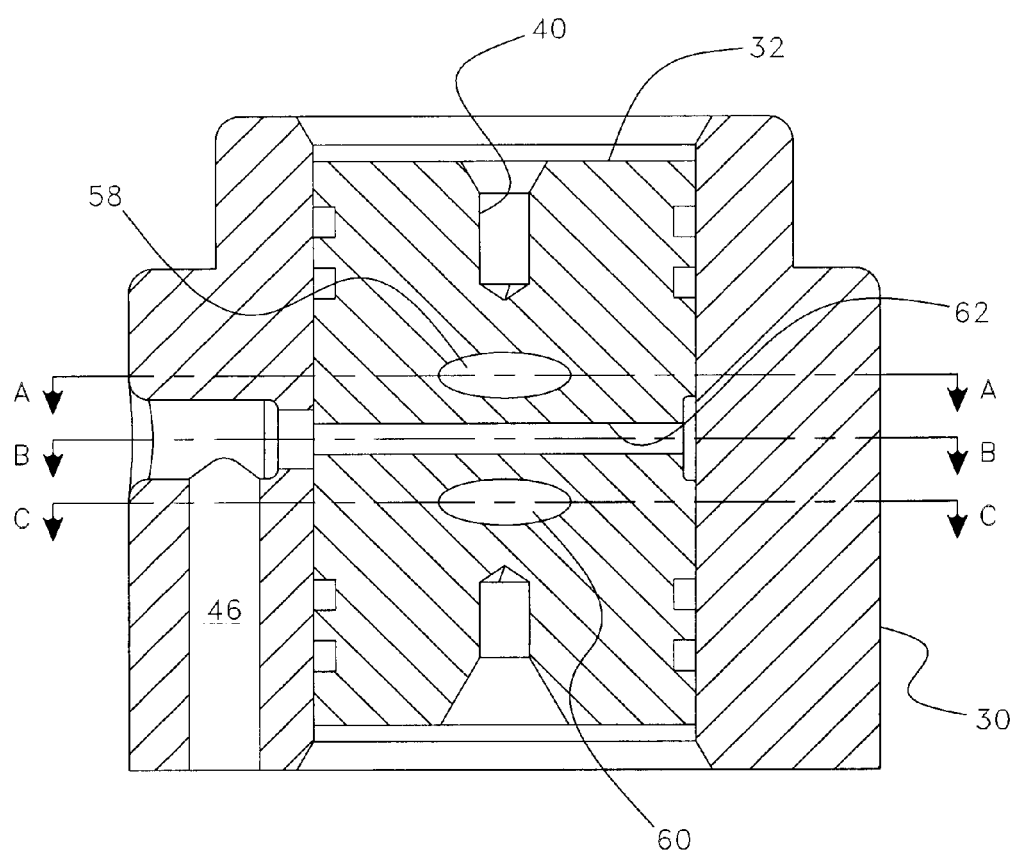
FIG. 13 is a cross-sectional view of the rotary valve.

Reference is also made now to FIGS. 7-12. Spool 32 includes a first metering channel 58 and a second metering channel 60 each extending transversely through the spool. First metering channel 58 connects fluid source passageway 46 of bushing 30 in flow communication with first metering conduit 50 of bushing 30 to open first fluid supply path (P to C1) when spool 32 is in the first metering position. Second metering channel 60 connects fluid source passageway 46 with second metering conduit 52 to open second fluid supply path (P to C2) when spool 32 is in the second metering position. Spool 32 may also include a pressure balancing channel 62 extending transversely through the spool for flow communication with fluid source passageway 46 when spool 32 is positioned anywhere within the range of travel defined by the first and second metering positions. In the embodiment shown, and best seen in FIGS. 11 and 12, first metering channel 58 and second metering channel 60 are in respective transverse planes that are axially spaced from one another along central axis 31, and pressure balancing channel 62 is in a transverse plane between first metering channel 58 and second metering channel 60. Pressure balancing channel 62 extends diametrically through spool 32, and aligns with fluid source passageway 46 (see FIG. 15). Pressure balancing channel 62 includes an axially elongated pocket 62A at its distal (fluid exit) end, wherein pocket 62A may be rectangular in shape. As best seen in FIG. 10, first metering channel 58 may extend diametrically through spool 32 at an angular spacing relative to pressure balancing channel 62, and second metering channel 60 may extend diametrically through spool 32 at an opposite angular spacing relative to pressure balancing channel 62. Thus, the directions of metering channels 58 and 60 may be symmetrically arranged relative to the direction of pressure balancing channel 62 about central axis 31. First metering channel 58 has a pair of pockets 58A, 58B forming axially elongated ports at opposite ends of the first metering channel. Similarly, second metering channel 60 has a pair of pockets 60A, 60B forming axially elongated ports at opposite ends of the second metering channel. Pockets 58A, 58B, 60A, and 60B may be rectangular in shape.

The illustrated spool 32 further includes a first return passage 64 and a second return passage 66. When spool 32 is in the first metering position, first return passage 64 is placed in flow communication with second metering conduit 52 of bushing 30, thereby opening the first return path (C2 to R1) by which fluid may return from the second chamber of the load to the system reservoir. Similarly, when spool 32 is in the second metering position, second return passage 66 is placed in flow communication with first metering conduit 50 of bushing 30, thereby opening the second return path (C1 to R2) by which fluid may return from the first chamber of the load to the reservoir. First return passage 64 includes a slot 64A opening through a first circumferential portion of spool 32, and may extend from slot 64A in a direction parallel to axis 31 to open through an end face 68 of spool 32. Second return passage 66 includes a slot 66A opening through a second circumferential portion of spool 32, and may extend completely through spool 32 from end face 68 to opposite end face 70 of spool 32.

Additional reference is now made to FIGS. 14-22 for describing operation of rotary valve 12. The null position of spool 32 with respect to bushing 30 is represented in FIGS. 14-16 at various transverse sectional planes along central axis 31. As may be seen in FIG. 15, the radial portion of fluid source passageway 46 is aligned with pressure balancing channel 62, whereby pressurized fluid entering valve 12 through fluid source passageway 46 exerts radial pressure on opposite sides of spool 32 to minimize undesirable spool imbalance. The projected area of pocket 62A may be equal to the projected area of fluid source passageway 46 where fluid source passageway 46 opens through inner wall 44 of bushing 30. At null, this ensures that supply pressure forces are balanced across the spool diameter. As spool 32 rotates away from the null position, balance is substantially maintained, with the net radial force being proportional to one minus the cosine of the spool rotation angle The incoming pressurized fluid is not conveyed to either pocket 58A of first metering channel 58 or to pocket 60A of second metering channel 60 arranged on opposite sides of pressure balancing channel 62, thereby preventing fluid supply to both chambers of the load. Return of fluid from the chambers back to the reservoir is also prevented in the null position. Referring to FIGS. 16 and 14, fluid returning through first metering conduit 50 in bushing 30 would enter pocket 58B of first metering channel 58, flow axially through pocket 58B and transversely through first metering channel 58 to pocket 58A, where it would reach a dead end. Referring to FIG. 16, fluid returning through second metering conduit 60 in bushing 30 would enter pocket 60B of first metering channel 60, flow transversely through first metering channel 60 to pocket 60A, where it would reach a dead end. Thus, in the null position, fluid supply paths (P to C1) and (P to C2) to the first and second load chambers are closed off from the pressurized fluid source by rotary valve 12, and fluid return paths (C2 to R1) and (C1 to R2) from the chambers to the reservoir are also closed off by valve 12.

The plan view of FIG. 10 also illustrates valve 12 in the null position, and further illustrates an arrangement of control edge pairs in accordance with an embodiment of the present invention. Bushing 30 and spool 32 include respective edges of fluid source passageway 46 and pocket 58A defining a first supply edge pair (P-C1). As will be explained further below, angular displacement of the edges in first supply edge pair (P-C1) relative to one another by rotation of spool 32 will open and close the first fluid supply path (P to C1). Bushing 30 and spool 32 further include respective edges of fluid source passageway 46 and pocket 60A defining a second supply edge pair (P-C2), wherein the respective edges of the second supply edge pair are angularly displaceable relative to one another by rotation of spool 32 to open and close the second fluid supply path (P to C2). Bushing 30 and spool 32 also include respective edges of return duct 54 and pocket 60B defining a first return edge pair (C2-R1), wherein the edges of the first return edge pair are angularly displaceable relative to one another by rotating spool 32 to open and close the first fluid return path (C2 to R1). Finally, bushing 30 and spool 32 include respective edges of return duct 56 and pocket 58B defining a second return edge pair (C1-R2), wherein the edges of the second return edge pair are angularly displaceable relative to one another to open and close the second fluid return path (C1 to R2). In accordance with an aspect of the present invention, rotary valve 12 comprises exactly one first supply edge pair (P-C1), exactly one second supply edge pair (P-C2), exactly one first return edge pair (C2-R1), and exactly one second return edge pair (C2-R1). In other words, redundant edge pairs are not provided.

In accordance with another aspect of the present invention, the first supply edge pair (P-C1) may be angularly spaced from the first return edge pair (C2-R1) by a first angle THETA1 greater than or equal to 120 degrees and less than 180 degrees, and the second supply edge pair (P-C2) may be angularly spaced from the second return edge pair (C1-R2) by a second angle THETA2 greater than or equal to 120 degrees and less than 180 degrees. The inventor has recognized that some imbalance of forces on spool 32 may be acceptable for certain applications, for example when valve mechanism 10 is used as a pilot stage servo valve. For ease of manufacturing, a symmetrical configuration may be used wherein the first angle THETA1 is equal in magnitude to the second angle THETA2. While first angle THETA1 and second angle THETA2 may fall within a broad range as described above, a narrower range wherein first angle THETA1 and second angle THETA2 are each equal to or greater than 140 degrees and less than or equal to 145 degrees is considered particularly suitable in view of manufacturing considerations, imbalance considerations, and flow requirements. In a favorably tested prototype, first angle THETA1 and second angle THETA2 were each equal to 142 degrees.

Figure 17:
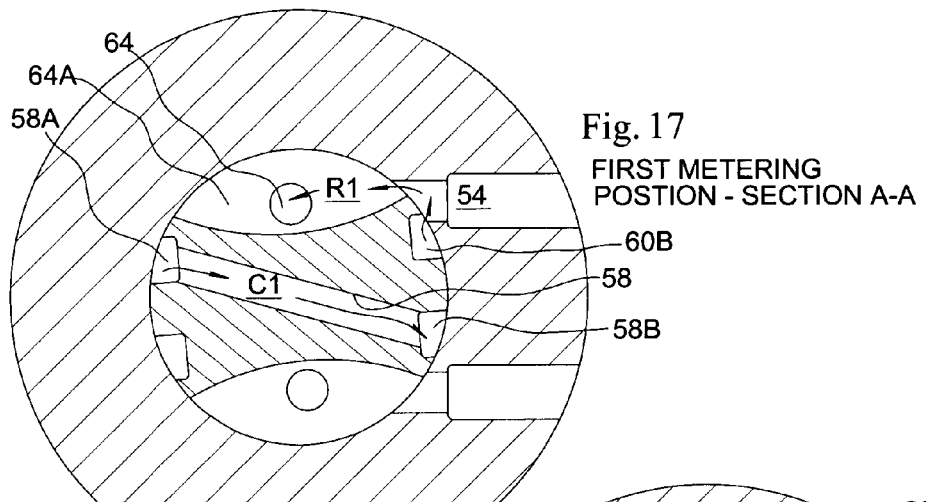
FIG. 17 is a sectional view of the rotary valve taken generally along the line A-A in FIG. 13, wherein the spool is shown in a first metering rotational position relative to the outer bushing of the rotary valve.
Figure 18:
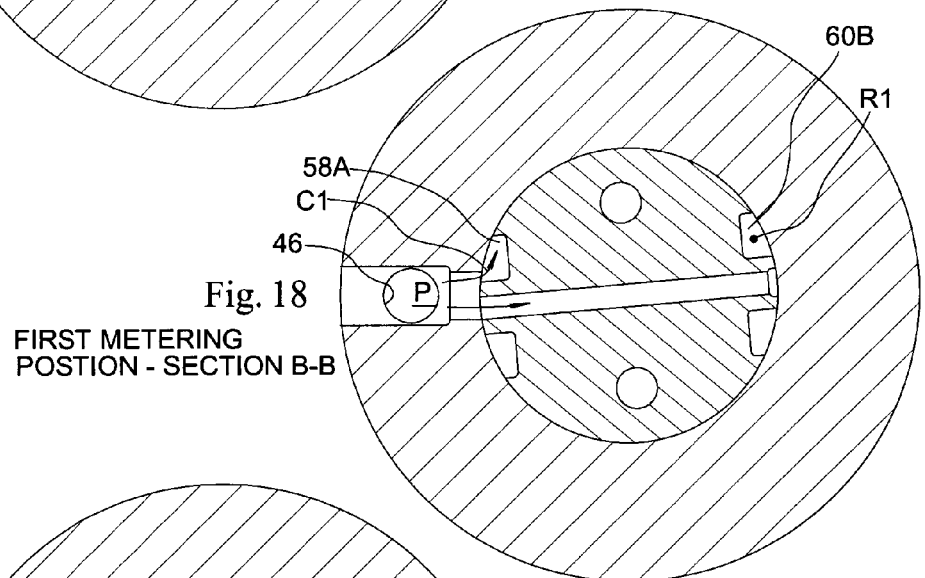
FIG. 18 is a sectional view of the rotary valve taken generally along the line B-B in FIG. 13, wherein the spool is shown in the first metering rotational position.
Figure 19:
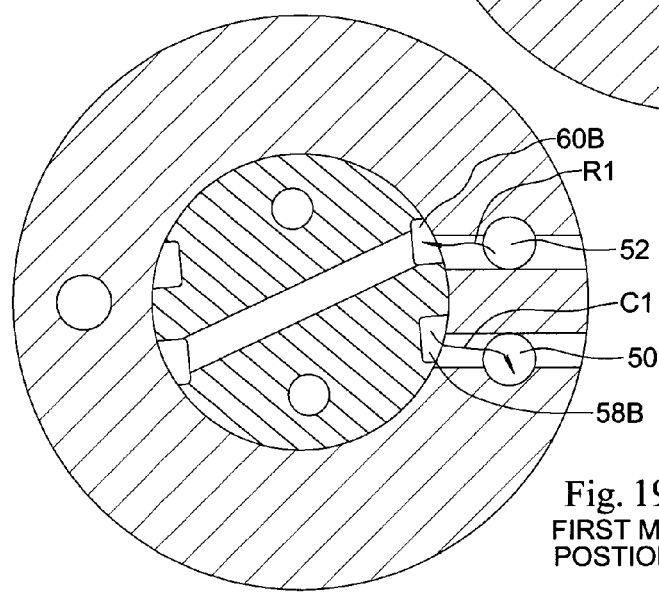
FIG. 19 is a sectional view of the rotary valve taken generally along the line C-C in FIG. 13, wherein the spool is shown in the first metering rotational position.

FIGS. 17-19 depict valve 12 when spool 32 is rotated to a first metering position relative to bushing 30. In the first metering position, first fluid supply path (P to C1) and first fluid return path (C2 to R1) are opened, while second fluid supply path (P to C2) and second fluid return path (C1 to R2) are closed. In FIG. 18, pressurized fluid from source (P) enters bushing 30 through fluid source passageway 46 and is redirected radially. A portion of the fluid enters pocket 58A, travels axially through pocket 58A and transversely through first metering channel 58 to pocket 58B, as shown in FIG. 17. In accordance with FIG. 19, the fluid travels axially through pocket 58B and flows into first metering conduit 50 which is in flow communication with the first chamber of a load (not shown). Also represented in FIG. 19, return flow from the second chamber of the load enters valve 12 through second metering conduit 52, and then enters pocket 60B. The fluid travels axially through pocket 60B until it reaches first return duct 54, as seen in FIG. 17. First return duct 54 is in flow communication with first return passage 64 by way of slot 64A, whereby flow may return to the fluid reservoir.

Figure 20:
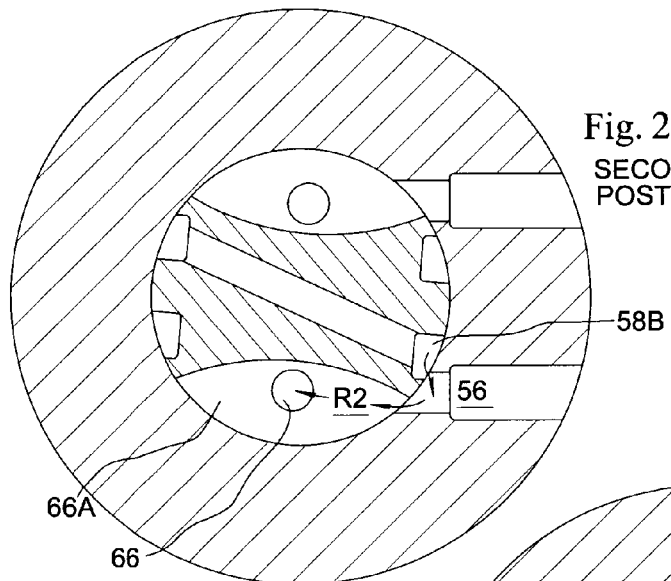
FIG. 20 is a sectional view of the rotary valve taken generally along the line A-A in FIG. 13, wherein the spool is shown in a second metering rotational position relative to the outer bushing of the rotary valve.
Figure 21:
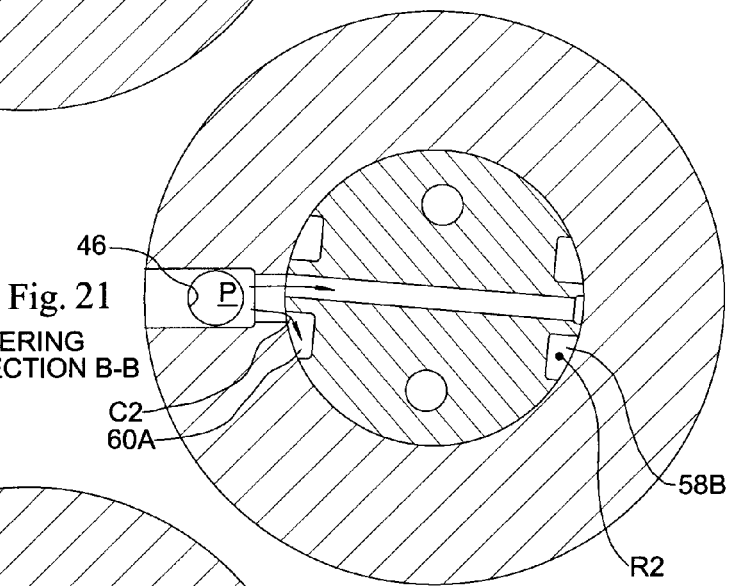
FIG. 21 is a sectional view of the rotary valve taken generally along the line B-B in FIG. 13, wherein the spool is shown in the second metering rotational position.
Figure 22:
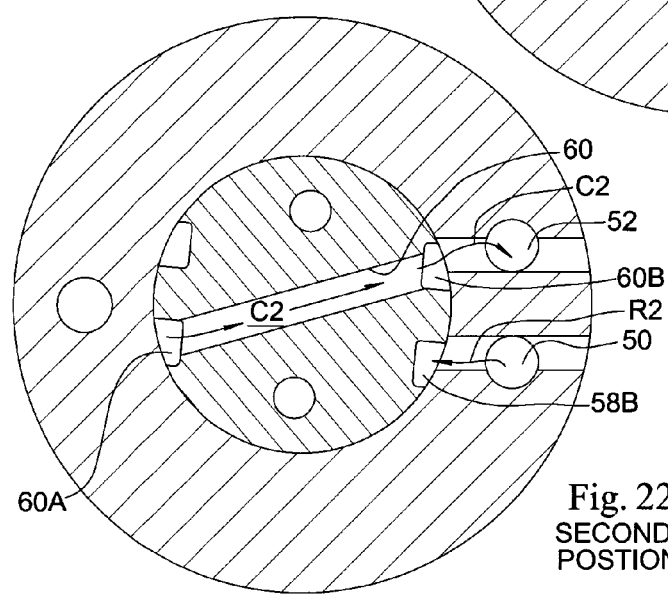
FIG. 22 is a sectional view of the rotary valve taken generally along the line C-C in FIG. 13, wherein the spool is shown in the second metering rotational position.

FIGS. 20-22 show valve 12 when spool 32 is rotated to a second metering position relative to bushing 30. In the second metering position, second fluid supply path (P to C2) and second fluid return path (C1 to R2) are opened, while first fluid supply path (P to C1) and first fluid return path (C2 to R1) are closed. In FIG. 21, pressurized fluid from source (P) enters bushing 30 through fluid source passageway 46 and is redirected radially. A portion of the fluid enters pocket 60A, travels axially through pocket 60A and transversely through second metering channel 60 to pocket 60B, as shown in FIG. 22. With continued reference to FIG. 22, it can be seen that the fluid flows into second metering conduit 52 which is in flow communication with the second chamber of the load. Also represented in FIG. 22, return flow from the first chamber of the load enters valve 12 through first metering conduit 50, and then enters pocket 58B. The fluid travels axially through pocket 58B until it reaches second return duct 56, as seen in FIG. 20. Second return duct 56 is in flow communication with second return passage 66 by way of slot 66A, whereby flow may return to the fluid reservoir.

Embodiments of the present invention are described in detail herein, however those skilled in the art will realize that modifications may be made. As one example, it is noted that fluid source passageway 46, metering conduits 50 and 52, and return ducts 54 and 56 are formed as drilled holes providing circular ports where they open through inner wall 44. If required, higher flow gain may be achieved by substituting rectangular metering ports. Such modifications do not stray from the spirit and scope of the invention as defined by the appended claims.

What is claimed is:

1. A rotary valve for metering fluid flow, the rotary valve comprising:
    a bushing including an axially extending cylindrical bore defining an inner wall of the bushing; and
    a cylindrical spool received by the cylindrical bore for rotation relative to the bushing about a central axis;
    the bushing and the spool being configured to provide a first fluid supply path, a second fluid supply path, a first fluid return path, and a second fluid return path, wherein the first and second fluid supply paths extend diametrically through the spool;
    the bushing and the spool including respective edges defining a first supply edge pair (P-C1), wherein the respective edges of the first supply edge pair are angularly displaceable relative to one another to open and close the first fluid supply path;
    the bushing and the spool further including respective edges defining a second supply edge pair (P-C2), wherein the respective edges of the second supply edge pair are angularly displaceable relative to one another to open and close the second fluid supply path;
    the bushing and the spool further including respective edges defining a first return edge pair (C2-R1), wherein the respective edges of the first return edge pair are angularly displaceable relative to one another to open and close the first fluid return path; and
    the bushing and the spool further including respective edges defining a second return edge pair (C1-R2), wherein the respective edges of the second return edge pair are angularly displaceable relative to one another to open and close the second fluid return path;
    wherein the rotary valve comprises exactly one first supply edge pair, exactly one second supply edge pair, exactly one first return edge pair, and exactly one second return edge pair.

2. The rotary valve according to claim 1, wherein the spool has a plurality of different rotational positions relative to the bushing including:
    a null position relative to the bushing wherein the first and second fluid supply paths are closed;
    a first metering position wherein the first fluid supply path is open and the second fluid supply path is closed; and
    a second metering position wherein the second fluid supply path is open and the first fluid supply path is closed.

3. The rotary valve according to claim 2, wherein the first fluid return path is open when the spool is in the first metering position relative to the bushing, and the second fluid return path is open when the spool is in the second metering position relative to the bushing.

4. The rotary valve according to claim 2, wherein the first metering position and the second metering position are symmetrically arranged about the null position in opposite angular directions.

5. The rotary valve according to claim 4, wherein the first metering position and the second metering position are each angularly spaced from the null position by an angle of less than five degrees.

6. The rotary valve according to claim 5, wherein the first metering position and the second metering position are each angularly spaced from the null position by an angle of approximately two degrees.

7. A rotary valve for metering fluid flow, the rotary valve comprising:
    a bushing including an axially extending cylindrical bore defining an inner wall of the bushing; and
    a cylindrical spool received by the cylindrical bore for rotation relative to the bushing about a central axis;
    the bushing and the spool being configured to provide a first fluid supply path, a second fluid supply path, a first fluid return path, and a second fluid return path;
    the bushing and the spool including respective edges defining a first supply edge pair (P-C1), wherein the respective edges of the first supply edge pair are angularly displaceable relative to one another to open and close the first fluid supply path;
    the bushing and the spool further including respective edges defining a second supply edge pair (P-C2), wherein the respective edges of the second supply edge pair are angularly displaceable relative to one another to open and close the second fluid supply path;
    the bushing and the spool further including respective edges defining a first return edge pair (C2-R1), wherein the respective edges of the first return edge pair are angularly displaceable relative to one another to open and close the first fluid return path; and
    the bushing and the spool further including respective edges defining a second return edge pair (C1-R2), wherein the respective edges of the second return edge pair are angularly displaceable relative to one another to open and close the second fluid return path;
    wherein the first supply edge pair (P-C1) is angularly spaced from the first return edge pair (C2-R1) by a first angle greater than or equal to 120 degrees and less than 180 degrees, and the second supply edge pair (P-C2) is angularly spaced from the second return edge pair (C1-R2) by a second angle greater than or equal to 120 degrees and less than 180 degrees;

wherein the first fluid supply path and the first fluid return path open and close together, and the second fluid supply path and the second fluid return path open and close together.

8. The rotary valve according to claim 7, wherein the first angle is equal in magnitude to the second angle.

9. The rotary valve according to claim 8, wherein the first angle and the second angle are equal to or greater than 140 degrees and less than or equal to 145 degrees.

10. A rotary valve for metering fluid flow from a source of pressurized fluid with respect to a first chamber and a second chamber in a fluid-powered load, the rotary valve comprising:
    a bushing including an axially extending cylindrical bore defining an inner wall of the bushing; and
    a cylindrical spool received by the cylindrical bore for rotation relative to the bushing about a central axis;
    wherein the bushing further includes a fluid source passageway adapted for communication with the source of pressurized fluid, a first metering conduit adapted for flow communication with the first chamber of the fluid-powered load, and a second metering conduit adapted for flow communication with the second chamber of the fluid-powered load;
    wherein the bushing further includes a first return duct open through the inner wall and a second return duct open through the inner wall;
    wherein the spool includes a first metering channel extending transversely through the spool, a second metering channel extending transversely through the spool, a first return passage, and a second return passage;
    wherein the spool has a null rotational position wherein the fluid source passageway is not in flow communication with either of the first and second metering channels, a first metering rotational position wherein the fluid source passageway is in flow communication with the first metering channel but not the second metering channel while the second metering channel is in flow communication with the first return passage by way of the first return duct, and a second metering position wherein the fluid source passageway is in flow communication with the second metering channel but not the first metering channel while the first metering channel is in flow communication with the second return passage by way of the second return duct; and
    wherein the first metering channel and the second metering channel extend diametrically through the spool.

11. A rotary valve for metering fluid flow from a source of pressurized fluid with respect to a first chamber and a second chamber in a fluid-powered load, the rotary valve comprising:
    a bushing including an axially extending cylindrical bore defining an inner wall of the bushing; and
    a cylindrical spool received by the cylindrical bore for rotation relative to the bushing about a central axis;
    wherein the bushing further includes a fluid source passageway adapted for communication with the source of pressurized fluid, a first metering conduit adapted for flow communication with the first chamber of the fluid-powered load, and a second metering conduit adapted for flow communication with the second chamber of the fluid-powered load;
    wherein the bushing further includes a first return duct open through the inner wall and a second return duct open through the inner wall;
    wherein the spool includes a first metering channel extending transversely through the spool, a second metering channel extending transversely through the spool, a first return passage, and a second return passage;
    wherein the spool has a null rotational position wherein the fluid source passageway is not in flow communication with either of the first and second metering channels, a first metering rotational position wherein the fluid source passageway is in flow communication with the first metering channel but not the second metering channel while the second metering channel is in flow communication with the first return passage by way of the first return duct, and a second metering position wherein the fluid source passageway is in flow communication with the second metering channel but not the first metering channel while the first metering channel is in flow communication with the second return passage by way of the second return duct;
    wherein the fluid source passageway opens through an end face of the bushing.

12. The rotary valve according to claim 11, wherein the first metering conduit and the second metering conduit open through the end face of the bushing.

13. The rotary valve according to claim 10, wherein the first metering channel is spaced from the second metering channel in an axial direction of the spool.

14. The rotary valve according to claim 13, wherein the first metering channel has a pair of axially elongated rectangular portal pockets respectively arranged at opposite ends of the first metering channel to face the inner wall of the bushing.

15. The rotary valve according to claim 13, wherein the second metering channel has a pair of axially elongated rectangular portal pockets respectively arranged at opposite ends of the second metering channel to face the inner wall of the bushing.

16. The rotary valve according to claim 13, wherein the spool further includes a pressure balancing channel extending transversely through the spool for flow communication with the fluid source passageway.

17. The rotary valve according to claim 16, wherein the pressure balancing channel extends diametrically through the spool and is arranged at an axial location between the first and second metering channels.

18. The rotary valve according to claim 17, wherein the pressure balancing channel includes an axially elongated pocket at a distal end thereof.

19. The rotary valve according to claim 11, wherein the first return passage and the second return passage open through an end face of the spool.

20. The rotary valve according to claim 11, wherein the first return passage includes a first slot opening through a first circumferential portion of the spool, and the second return passage includes a second slot opening through a second circumferential portion of the spool.

* * * * *